US008567074B2

(12) United States Patent  (10) Patent No.: US 8,567,074 B2
Arnetoli  (45) Date of Patent: Oct. 29, 2013

(54) GRASS-CUTTING HEAD (75) Inventor: Fabrizio Arnetoli, Florence (IT)

(73) Assignee: Arnetoli Motor S.r.l., Florence (IT)

( * ) Notice: Subject to any disclaimer, the term of this patent is extended or adjusted under 35 U.S.C. 154(b) by 174 days.

(21) Appl. No.: 13/255,608

(22) PCT Filed: Feb. 19, 2010

(86) PCT No.: PCT/IT2010/000062
§ 371 (c)(1),
(2), (4) Date: Sep. 9, 2011

(87) PCT Pub. No.: WO2010/103558
PCT Pub. Date: Sep. 16, 2010

(65) Prior Publication Data
US 2012/0000079 A1  Jan. 5, 2012

(30) Foreign Application Priority Data
Mar. 12, 2009 (IT) ................ FI2009A0046

(51) Int. Cl.
*A01D 34/416* (2006.01)
*A01D 34/00* (2006.01)
*B26B 7/00* (2006.01)
(52) U.S. Cl.
USPC .................. 30/276; 30/347; 56/12.7
(58) Field of Classification Search
USPC ............ 30/276, 347, 337; 56/12.7; 29/401.1, 29/426.5
See application file for complete search history.

(56) References Cited

U.S. PATENT DOCUMENTS

| 2004/0134078 A1 | 7/2004 | Pfaltzgraff | |
| 2009/0172955 A1* | 7/2009 | Morris et al. | 30/276 |
| 2010/0064530 A1* | 3/2010 | Pfaltzgraff | 30/276 |
| 2011/0239468 A1* | 10/2011 | Conlon | 30/276 |

FOREIGN PATENT DOCUMENTS

| EP | 0525195 | 2/1993 |
| EP | 0784919 | 7/1997 |
| WO | 01/49101 | 7/2001 |
| WO | 2006/036455 A2 | 4/2006 |
| WO | 2008/026151 A2 | 3/2008 |
| WO | 2008053508 | 5/2008 |

* cited by examiner

*Primary Examiner* — Ghassem Alie
(74) *Attorney, Agent, or Firm* — McGlew and Tuttle, P.C.

(57) ABSTRACT

A grass-cutting head (10) including a spool (11) for winding at least one cutting line and a housing (12) for the cutting line. The housing (12) includes a first part (13) and a second part (14) coupled to each other so as to allow at least one reciprocal angular movement around the axis (X) of rotation of the grass-cutting head. The housing (12) presents at least one passage (31) towards the outside for the cutting line. On the spool (11) is defined at least one inserting portion (33) for inserting the cutting line so that to a rotation of the spool corresponds a winding or an unwinding of the line. Elements (25, 26, 27, 28, 29) are present for winding the cutting line on the spool (11) and matching elements (35, 36) for matching the angular position of the portion (33) of insertion on the spool (11).

19 Claims, 6 Drawing Sheets

GRASS-CUTTING HEAD

TECHNICAL FIELD

The present invention relates to the sector of the devices for cutting grass and of the brush cutters, and more in particular the object of the present invention is a grass-cutting head comprising a spool carrying one line (or more lines) exiting from the side of the head for operating in rotation for cutting grass or bushes. To the spool is connected a mechanism allowing a relative rotation to allow unwinding of the line and replace the correct length of the line in the case of breakage or wear. During use, the line is blocked on the head.

STATE OF THE ART

Different types of heads as that indicated above are well known. Embodiments are described for example in the patent documents EP0525195, EP0784919, WO01/49101. In general, in these heads the mechanism for unwinding the line provides that a portion of the spool projects from the lower base of the outer casing of the head so as to abut against the ground. To an action of pressure of the head on the ground at this projecting portion correspond an axial translation of the spool relative to the casing, with the consequent disengagement of the spool from adequate toothings that make it integral to the casing. Spool and casing are disengaged as follows: the motor continues to rotate the casing whilst the spool is fixed. The two ends of the cutting line (inserted passing through an hole transverse to the hub of the spool and wound around it) develop from the spool and exit from the casing through two adequate passages or holes, and therefore, during the phase of disengaging of the spool from the casing, the cutting line is unwound and guided towards the outside for a given length. In use, the line is blocked on the head due to the effect of two opposite cutting forces (i.e. with direction parallel to the axis of the head) obtained on the line respectively by the spool and by the casing and due to the different axial position of the hole on the hub of the spool and of the passages on the casing.

In this type of heads, one of the most typical problem is that of reloading the spool with new line when the old one is finished. To perform this operation it is necessary to rotate the spool by acting on the portion projecting from the casing and to align the two holes of this latter with the hole on the hub of the spool.

To allow this alignment, on the projecting portion of the spool are generally present two opposite arrows, which are aligned to the axis of the through hole defined on the hub of the spool. These arrows act as matching means between the angular position between the holes on the casing and the hole for inserting the hub on the spool, when they are carried in correspondence of the first ones, and allow to facilitate the operations of inserting the cutting line in the spool.

However, these angular matching arrows for matching between the holes of the casing and of the spool tend to wear quickly, as they are obtained on a rotating surface that comes into contact with the ground. Therefore, when there is the need to reload the head with new line, there aren't more references for helping in aligning the holes.

OBJECT AND SUMMARY OF THE INVENTION

The main object of the present invention is to solve the drawbacks of the grass-cutting heads of the known type described above, providing a grass-cutting head that provides for matching means for the angular position between casing and spool, to facilitate the insertion of the cutting line (or cutting lines), which are resistant over time and easy to be used.

This and other objects, which will be explained hereunder, are achieved with a grass-cutting head comprising a spool for winding at least one cutting line and an housing for the at least one cutting line, wherein said housing comprises a first part and a second part coupled to each other so as to allow at least one reciprocal angular movement around the axis of rotation of the grass-cutting head. The housing presents at least one passage towards the outside for a cutting line. On the spool is defined at least one portion for inserting a cutting line so that to each rotation of the spool corresponds a winding or an unwinding of the line. Means are furthermore present for winding the cutting line on the spool and matching means for matching the position of the portion of insertion on the spool and the corresponding passage towards the outside of the housing, suitable to facilitate the operations of inserting the cutting line in the spool. The special characteristic of the present invention is that the matching means for matching the angular position comprise at least one reversible coupling between an abutment associated to one of said first and second part and a corresponding counter-abutment associated to the other of said first and second part.

BRIEF DESCRIPTION OF THE DRAWINGS

The invention will be better understood by following the description below and the attached drawings, in which.

DETAILED DESCRIPTION OF AN EMBODIMENT OF THE INVENTION

With reference to FIGS. 1 to 6 cited above, a grass-cutting head according to the present invention is indicated, in its entirety, with number 10.

Figure 1:
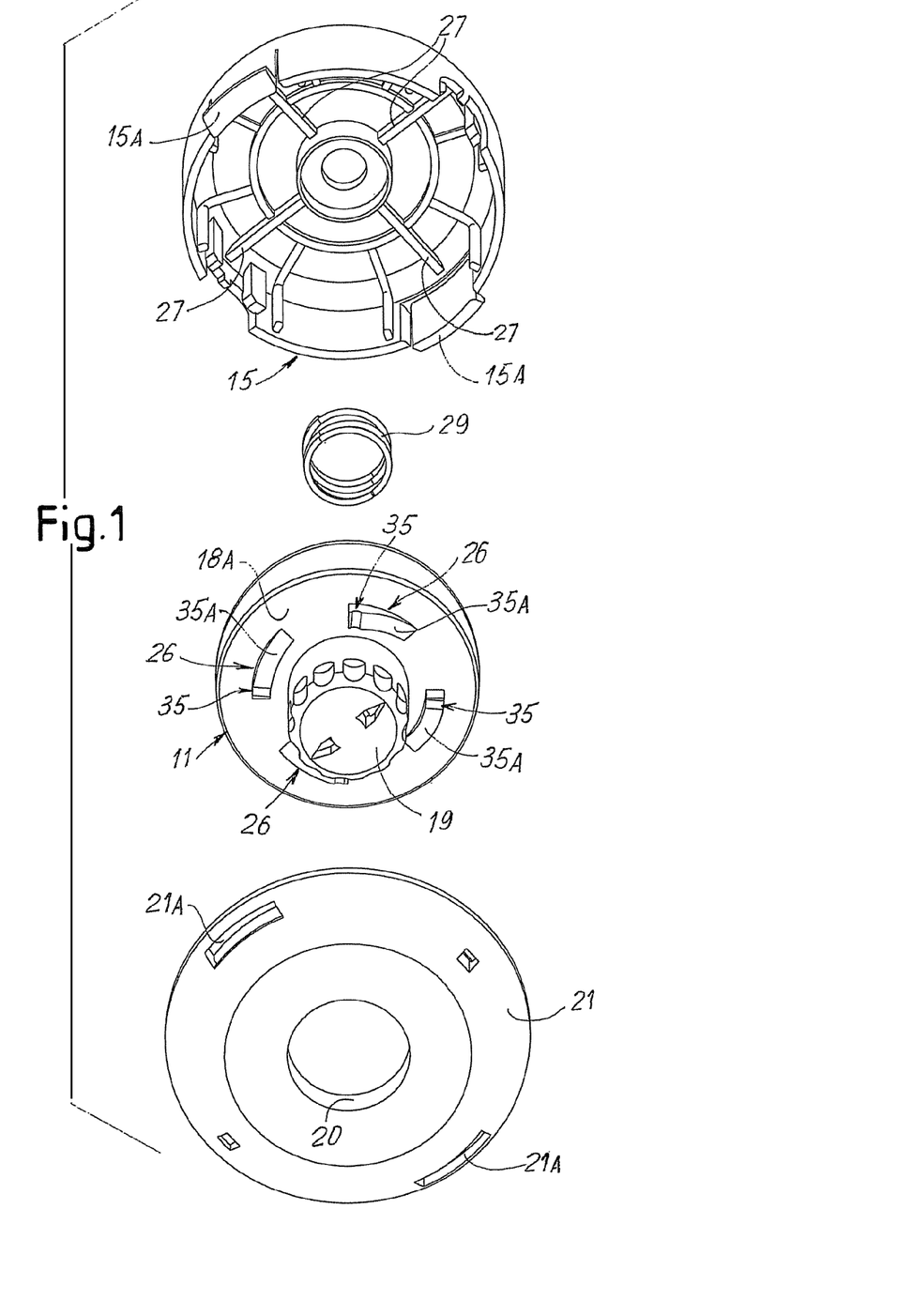
FIG. 1 is an exploded axonometric view, from the bottom, of a grass-cutting head according to the present invention.
Figure 2:
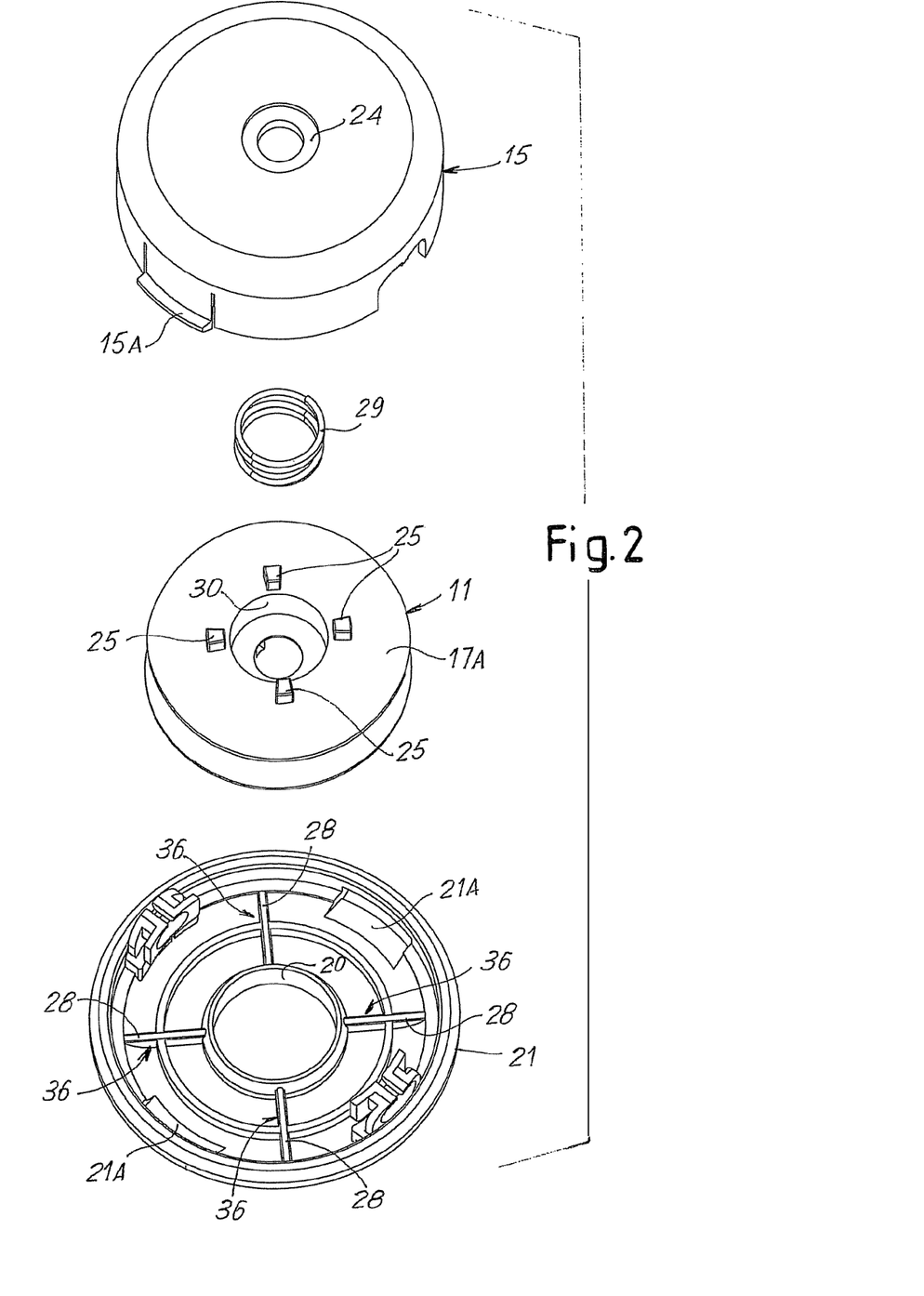
FIG. 2 is an exploded axonometric view, from the top, of the grass-cutting head of FIG. 1.
Figure 3:
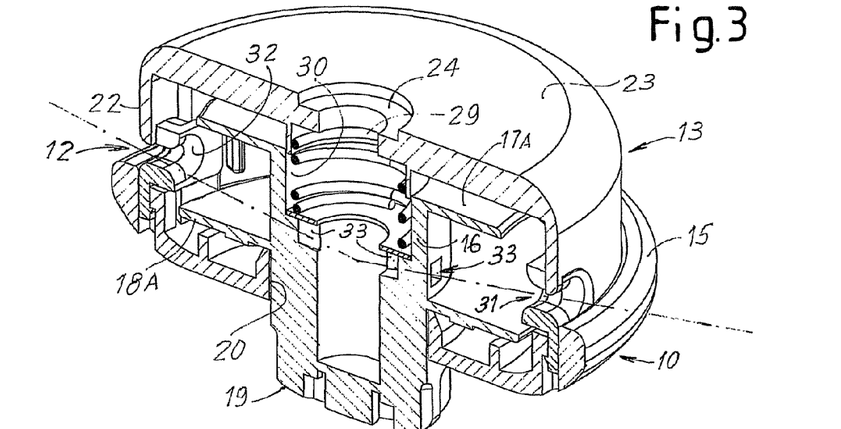
FIG. 3 is a cut away axonometric view from the top of the head shown in the previous figures.
Figure 4:
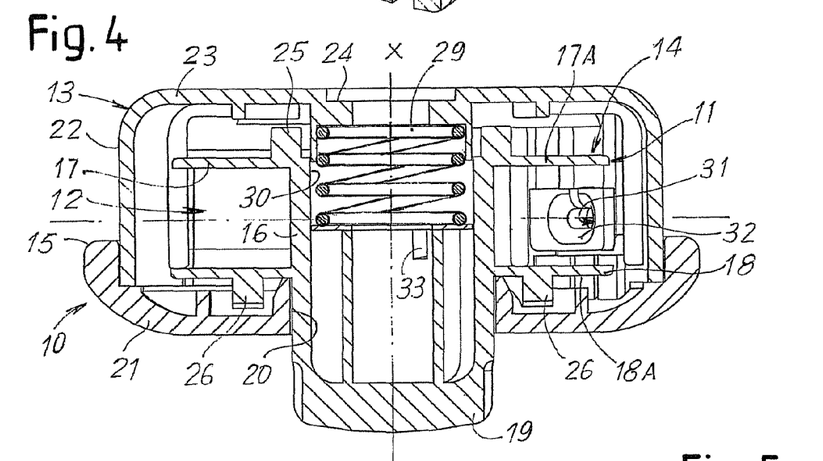
FIG. 4 is a cut away front view of the head as illustrated in the previous figures, shown in a first position, corresponding to a working position.
Figure 5:
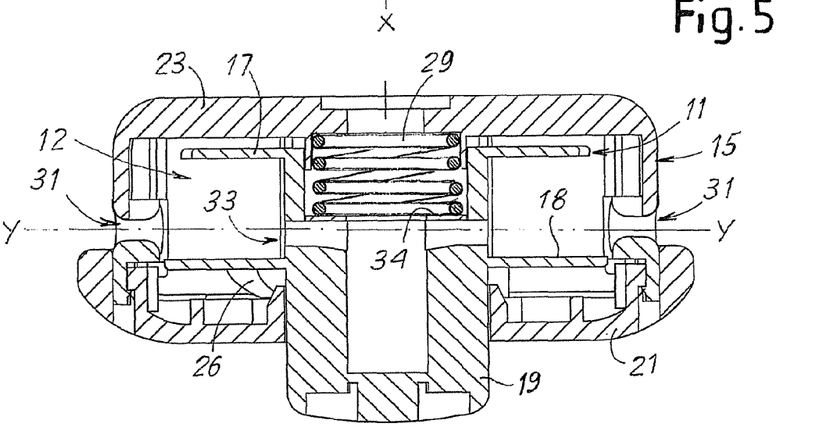
FIG. 5 represents the view of FIG. 4 with the head shown in a second position, corresponding to a phase of reloading the cutting line(s)

This head 10 comprises a spool 11 for winding a cutting line (not indicated in the figures for the sake of simplicity) and a housing 12 for the cutting line; in FIG. 3 a diagram of the direction of exit from the head of the end segments of the line is obtained through two sections of broken incident lines. The cutting head according to the present invention also comprises means for winding the cutting line around the spool 11, described in greater detail hereunder.

The housing 12 is formed by a first part 13 and a second part 14 coupled to each other in such a manner as to allow a reciprocal angular movement around the axis of rotation of the grass-cutting head and, in this embodiment, also a movement of relative translation along this axis of rotation.

In particular, in the embodiment under description, the head 10 comprises an outer casing 15, which contains most of the spool 11. The casing 15 defines, in the preferred embodiment of the present invention, the first part 13 of the housing 12, whilst the spool 11 defines the corresponding second part 14. Practically, casing 15 and spool 11 delimit the housing 12.

In particular, in this example of embodiment, the spool 11 comprises, in its main structural elements, a cylindrical central hub 16, from which two parallel flanges 17 and 18 develop, respectively an upper flange and a lower flange. The upper/lower reference is related to an arrangement of the head 10 with axis X of rotation orthogonal to the ground and oriented so as to cut grass at the ground. From the lower flange 18 a body 19 develops, which is practically in this example a continuation of the hub 16, passing through a circular aperture 20 obtained on the lower base 21 of the casing 15. It should be noted that the lower base 21 also acts as a removable lid for the casing (the connection between base 21 and casing 15 occurs through a snap coupling, i.e. through elastically deformable tabs 15A defined on the flanks of the casing and provided with retaining portion for a corresponding undercut seat 21A defined on the base 21) in order to allow the access thereof to the inside in the case of maintenance. Casing and spool are, in this example, preferably coaxial to the axis X.

The housing 12 for the cutting line is practically delimited by the lateral flanks 22 of the casing 15, by the hub 16 and by the flanges 17 and 18.

As mentioned above, casing 15 and spool 11, i.e. said first and second part 13 and 14 of the housing 12, are coupled to each other so that they can translate (in addition to rotating) relatively, i.e. in such a manner that the above mentioned body 19, projecting outside the casing through the circular aperture 20, can move along the axis X of rotation (coinciding with the axis of the aperture 20), i.e. it is arranged in a slidable manner in the aperture 20, acting as a guide.

On the upper base 23 of the casing 15 is preferably present a shaping 24 for fixing the transmission element (not shown in the figures) for transmitting the rotary motion coming from the motorization of the brush cutting machine.

On the upper face 17A of the upper flange of the spool a first series of teeth 25 is present, developing according to a circumference coaxial with the axis of the spool. Analogously, on the lower face 18A of the lower flange 18 a second series of teeth 26 is present, developing according to a circumference coaxial with the axis of the spool. This first and second series of teeth 25 and 26 are mutually axially and angularly displaced.

On the casing 15, i.e. the first part 13 of the housing 12, a toothing is present, suitable to interact alternatively with the first series 25 and the second series 26 according to the axial relative position of the casing and of the spool (i.e. of the first and second part 13 and 14), according to a known method. In this example, this toothing comprises a first toothing 27 obtained on the upper base 23 of the casing 15 in the form of radial ribs, which interacts with the first series of teeth 25, and a second toothing 28, obtained on the lower base 21 of the casing, also in the form of radial ribs, suitable to interact with the second series of teeth 26. These first and second toothing 27 and 28 are mutually angularly displaced.

The series of teeth 25 and 26 with the toothings 27 and 28 form, together with elastic means 29, means for winding the cutting line around the spool 11. These elastic means 29 are arranged between the first part 13 and the second part 14 and act so that to a relative axial displacement of the first and second part 13 and 14 (i.e., in this example, the casing 15 and the spool 11) from a position, wherein the head is in position for cutting (see FIGS. 3 and 4) to a position (see FIGS. 5 and 6) wherein the head 10 is ready for receiving or extracting the line in/from the spool (as better described hereunder), corresponds a compression of the elastic means 29. This compression occurs between a position, wherein these elastic means 29 intersect the direction Y (FIG. 4) of inserting the cutting line towards the spool, to a position wherein the elastic means 29 are moved away from said direction Y of inserting towards the spool 11.

In particular, the elastic means 29 are arranged between the spool 11 and the casing 15 in such a manner as to contrast a relative movement of the body/spool 19/11 and of the casing 15 so as to bring the body 19 towards the inside of the casing. In this example, the elastic means 19 are embodied by an helical spring arranged in a cylindrical pocket 30 defined at the end by the hub 16 of the spool 11 and coaxially to the axis of this latter.

The housing 12 presents, in this example, a pair of passages 31, radially opposite relative to the axis of rotation of the head. These passages 31 are embodied by a pair of mutually opposite through holes defined on the lateral flanks 22 of the casing 15, delimited by bushings 32.

On the spool 11 is defined an inserting portion 33 for inserting the cutting line so that to a rotation of the spool corresponds a winding or an unwinding of the line. In this example, the inserting portion 33 provides for a perforation passing through the hub 16 of the spool 11 according to an orientation radial and orthogonal (i.e. transverse) to the axis X of the spool (i.e. of the head).

As it can be noted, this through perforation 33 is obtained in the portion of hub comprised between the flanges 17 and 18 of the spool 11, in a position outside the pocket 30 but next to it. In particular, the perforation 33 and the pocket 30 are separated by a platform element 34 forming a wall of the hole and the base of the pocket.

In use, the line is blocked on the head due to the effect of two opposite thrusts with direction parallel to the axis X of the head obtained on the line respectively by the spool (by means of the edges of the perforation 33) and by the casing (by means of the edges of the passages 31) and due to the presence of the elastic means 29 which make different the axial position of the perforation 33 on the hub of the spool and of the passages 31 on the casing.

Figure 6A:
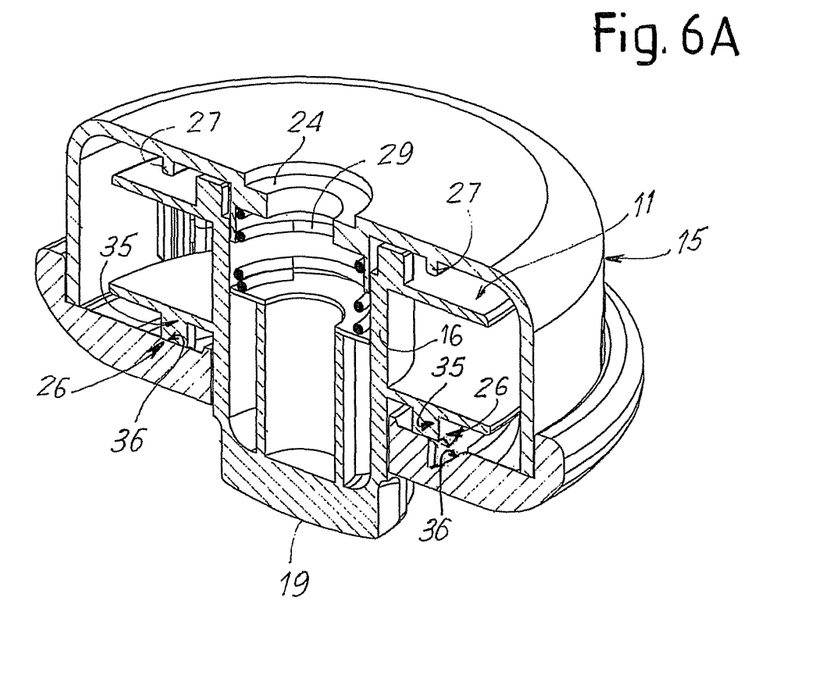
FIG. 6A is a cut away axonometric view from the top of the head as in the previous figures, shown in the second position of FIG. 5, but with a different angle relative to FIG. 5.
Figure 6B:
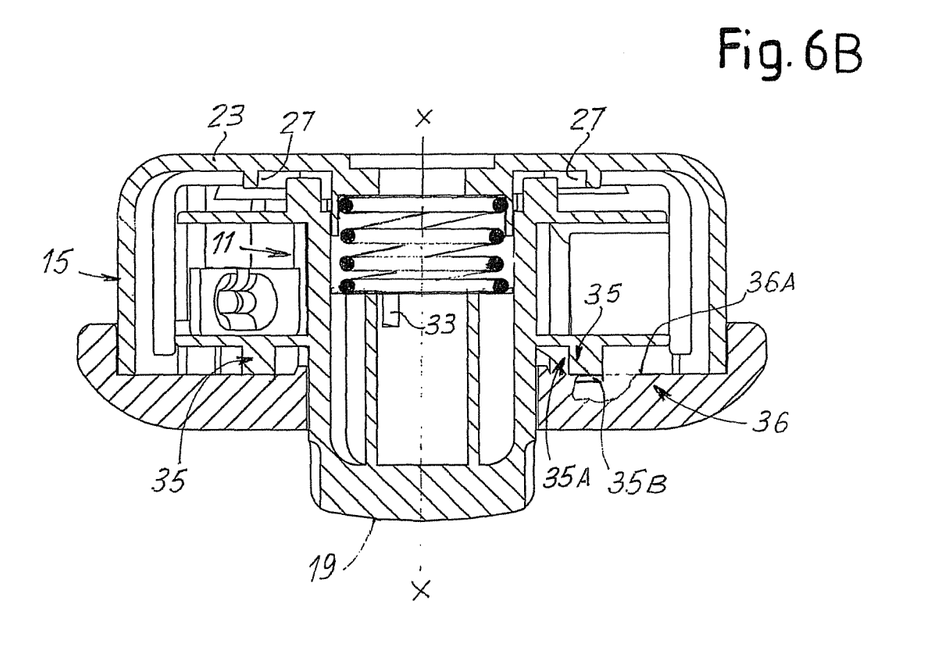
FIG. 6B represents a front view of the section of the head of FIG. 6A.
Figure 6C:
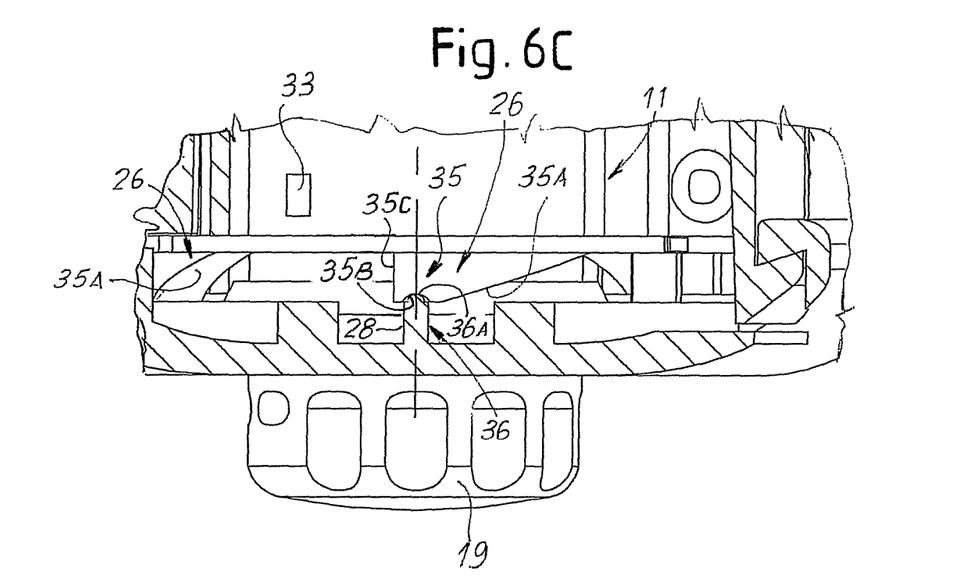
FIG. 6C represents a front view of a detail, cut away according to a plane orthogonal to that of FIG. 6B, of the head in the position shown in FIGS. 6*a* and 6*b;*

According to the present invention, between the first part 13 and the second part 14 (in this example, the casing 15 and the spool 11) a reversible coupling is present (see in particular FIG. 6) between an abutment 35 associated to the second part and a corresponding counter-abutment 36 associated to the first part, whose main function, when coupled, is that of acting as matching means for matching the angular position of the perforation 33 on the spool 11 with the opposite passages 31 defined on the casing 15 to facilitate the operation of inserting the cutting line in the spool. Practically, when abutment and counter-abutment are coupled, perforation 33 and passages 31 are mutually aligned, thus allowing the cutting line to pass throughout easily.

The abutment 35 comprises a ramp 35A and a subsequent seat 35B for reversible coupling, on which the corresponding counter-abutment 36 is able respectively to strip and to couple. Abutment and counter-abutment are structured in the head 10 in such a manner that to the stripping on the ramp 35A of the counter-abutment 36 corresponds a relative axial displacement between the first and the second part 13 and 14 (i.e., in this example, between casing 15 and spool 11) from a position, wherein the head is in a use position, to a position, wherein the head is ready to receive or extract the cutting line from the spool.

Preferably, the abutment 35 is a tooth comprising an inclined stripping face constituting the ramp 35A and an opposite abutment face 35C for the tooth itself. On the tip of this tooth, between the two inclined (35A) and abutment (35C) faces, the coupling seat 35B is defined for the complementary counter-abutment 36. According to the example described, the seat 35B is concave and reentries towards the body of the tooth; the complementary counter-abutment 36 is practically formed by a projection with head 36A substantially counter-shaped to the seat 35B.

According to the preferred embodiment of the present invention, the tooth forming the abutment 35 constitutes a tooth of the second series of teeth 26 present on the lower face 18A of the lower flange 18, whilst the projection forming the counter-abutment 36 exits from the lower base 21 of the casing 15. In particular, all the teeth of the second series 26 present at least one ramp face as that of the abutment 35, with an angular orientation substantially concord to that of the ramp of the abutment 35.

Operation of the head is as follows. When the head is in cutting phase, the helical spring 29 pushes the spool 11 towards the lower base 21 of the casing 15, with the second series of teeth 26 abutting laterally on the second toothing 27 present on the same lower base 21. Casing and spool therefore rotate together, as the casing, through the interaction between second series of teeth and toothing, carries the spool into rotation. The teeth of the second series present a ramp inclined face and an abutment face, and therefore the second toothing 27, taking as a reference the direction of rotation of the casing during the cutting phase, is suitable to abut against these abutment faces.

The cutting line is wound about the hub 16, between the flanges 17 and 18, and presents end segments exiting from the passages 31 defined on the flanks 22 of the casing. When it is necessary to elongate these end segments, for example as they are worn, it is sufficient to press the head against the ground, thus pressing the body 19, which partially reenters inside the casing winning the resistance of the spring 29. This axial movement towards the inside of the body/spool makes the second series of teeth disengage from the second toothing, whilst the first series of teeth 25 of the upper flange 17 of the spool engages with the first toothing 27 on the upper base 23 of the casing. The engagement of these latter occurs, thanks to the displacement between series of teeth, after a partial relative rotation casing/spool, such as to unwind a portion of line from the spool towards the outside of the casing through the passages 31.

According to the present invention, if it is necessary to remove the residual line from the spool or insert and wind new line on it, it is necessary to align the passages 31 on the lateral flanks of the casing with the inserting portion 33 obtained transversally to the spool 11. To do this it is sufficient, by acting on the body 19, to rotate the spool in a direction opposite to that of rotation of the head 10. The teeth of the second series 26 meet with their inclined faces the second toothing 28. The inclination of the teeth causes a compression action of the helical spring 29 with axial movement of the spool and contemporaneously rotation, thus allowing the teeth of the second series 26 to overcome the teeth of the second toothing 28.

When the tooth of the second series 26 acting as abutment 35 meets the projection constituting the counter-abutment 36, the same compressive effect of the spring 29 occurs, with axial movement of the spool. When the head 36A of the projection of the counter-abutment 36 enters the seat 35B defined on the tip of the tooth acting as abutment 35, a coupling occurs, contrasting the continuation of the rotation between spool and casing. This coupling can be perceived by the user, who therefore stops the action of rotation. To this coupling position between abutment and counter-abutment corresponds an alignment of the passages 31 on the casing 15 with the perforation 33 on the spool 11, thus allowing the insertion of the cutting line. Abutment and counter-abutment act therefore as matching means of the angular position between passages 31 on the casing 15 with the perforation 33 on the spool 11.

It should be noted that these angular matching means are inside the head 10 and therefore they are not subjected to the wear due to the stripping with the ground, to which are instead subjected the reference arrows arranged on the outer body of the spool of the heads of the known type.

Advantageously, the direction Y of inserting the cutting line through the passages 31 towards the spool 11 intersects the elastic means 29 (the helical spring) when they are not compressed due to the effect of the axial movement of the spool (i.e. the spool and the casing are reciprocally arranged for a cutting action of the head), whilst it does not intersect these elastic means when they are compressed during coupling between abutment and counter-abutment on the spool. This allows dimensioning adequately the inside of the head (with fixed outer dimensions) maximizing the thickness of the upper base at the coupling portion 24 for coupling to the transmission of the motorization to which the head must be applied, thus obtained a more strong connection. This advantage is practically due to the fact that there is not the design constraint present in the known heads, due to the fact that the helical spring is always compressed between the direction of inserting the cutting line and base of the casing.

Figure 7:
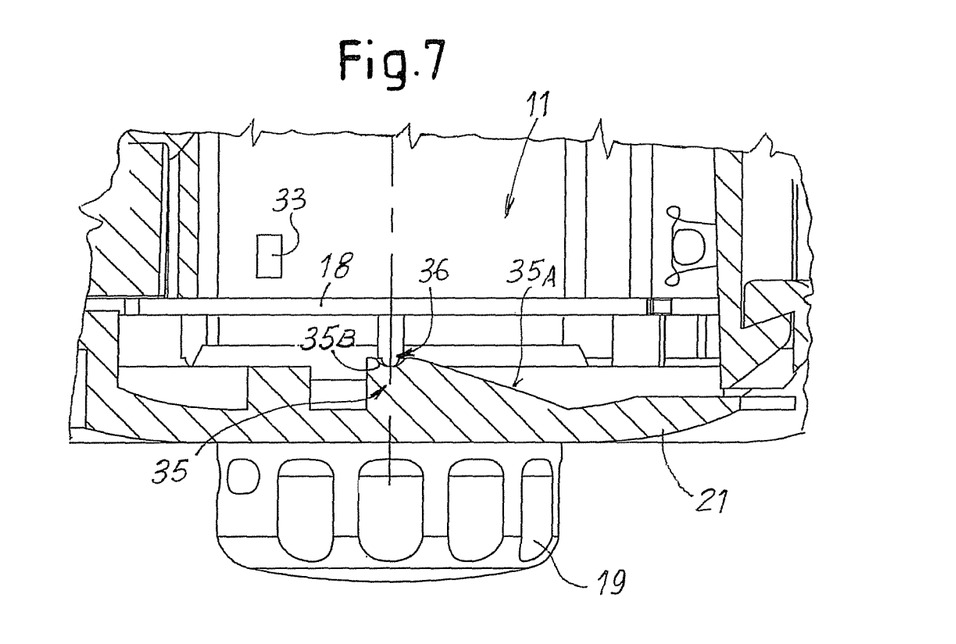
FIG. 7 is a cut away front view of a detail of a variant of a head relative to that shown in the previous figures, shown in the same position of FIG. 6.

It is clearly apparent that according to the present invention many different configurations of the components of the head are possible. With reference to FIG. 7, for example, it is possible to obtain the abutment 35 on the lower base 21 of the casing 15 (i.e. on the first part forming the housing 112 of the cutting line), preferably on the second toothing 28 present on this base, and to obtain the counter-abutment 36 on the lower flange 18 of the spool 11 (i.e. on the first part of the housing of the cutting line).

Furthermore, according to another embodiment, not shown, it is possible to obtain the abutment on the upper flange (for example of the first series of teeth) and the counter-abutment on the upper base. Furthermore, it is possible to obtain the abutment on the upper base (for example on the first toothing) and the counter-abutment on the upper flange of the spool. In these two latter examples, the elastic means are preferably arranged between the spool and the lower base of the casing.

It should be furthermore noted that in general it is sufficient a single abutment and a single counter-abutment to define a correct correspondence of the angular position of one or more inserting portions on the spool with corresponding one or more passages towards the outside of the housing of the cutting line. However, it is clearly apparent that, depending upon the number of cutting lines exiting from the housing defined by the casing and by the spool according to a given angular pitch (i.e. according to the numerous passages and inserting portions present on the casing and on the spool), it could be convenient to have more than one abutment (and at least one corresponding counter-abutment) to limit the rotation of the spool by the user for angles equal to the pitch between the lines and not for (at the maximum) a whole round angle ($2\pi$ radiants) to find the exact match.

In the example described above the case is cited of a spool with two opposite abutments defined on two opposite teeth of a series of four teeth defined on the lower flange. As mentioned above, this configuration can be used for example in the case of a single cutting line with two cutting ends exiting from the casing. In this case, if a single counter-abutment is used, a rotation will be necessary of (maximum) $\pi$ radiants, whilst if two opposite counter-abutments are used, a rotation will be necessary of (maximum) $\pi/2$ radiants to find the correct match.

Figures 8, 9, 10:
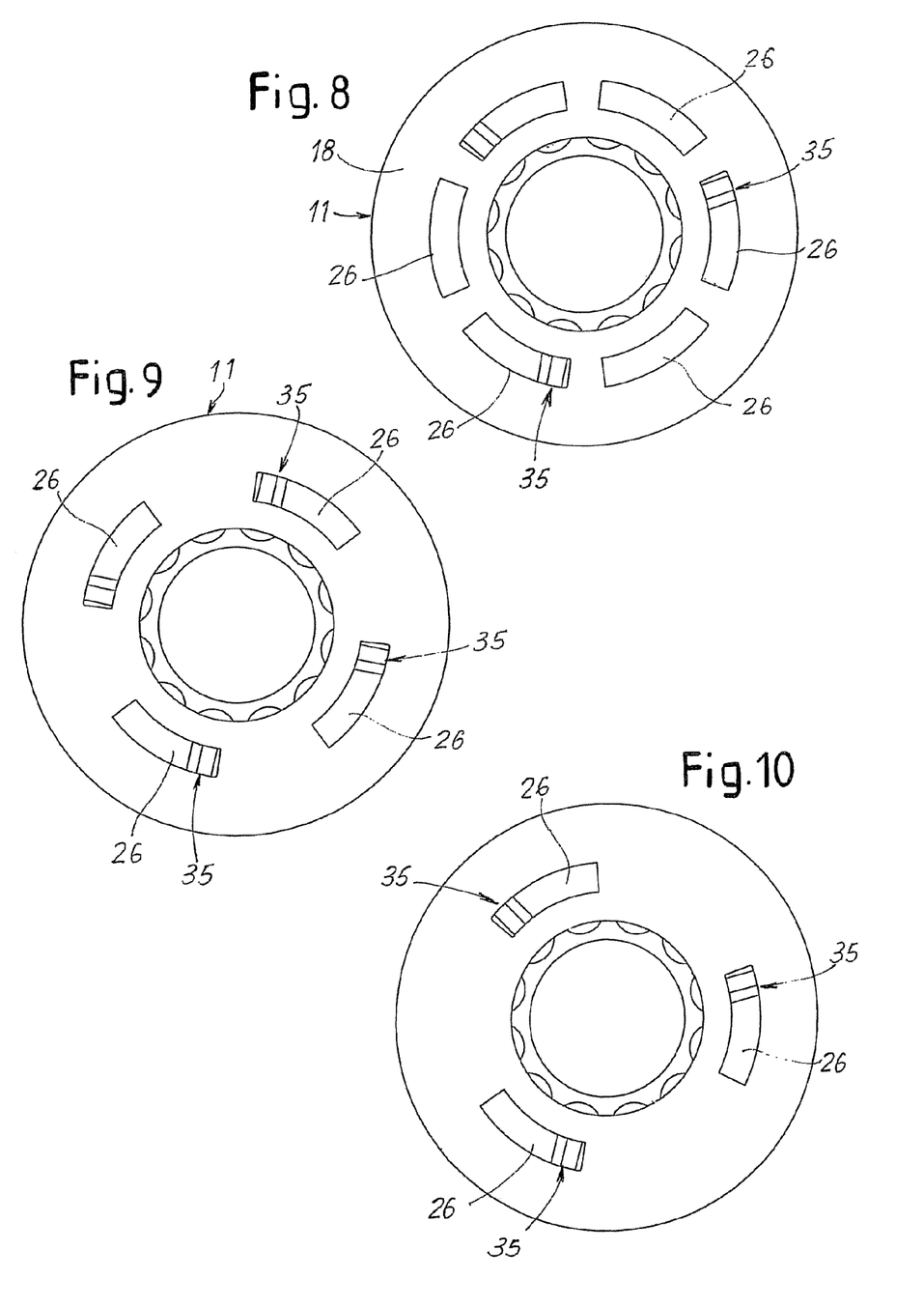
FIGS. 8, 9, and 10 are three plan views of three distinct spools of heads according to the present invention, variant relative to that of the heads illustrated in the previous figures.

FIG. 8 shows for example the case of a spool with three abutments 35 defined on three teeth, angularly displaced by $\pi/3$ radiants, of a series 28 of six defined on the lower flange 18 of the spool 11. This configuration can be used for example in the case of three cutting lines with two cutting ends exiting from the casing or three cutting lines, each with a cutting end. In this case the number of abutments is indifferently 1, 2, or 3 (adequately displaced), as there is, each $\pi/3$ radiants, a coupling, which causes the correct relative position spool/casing.

FIG. 9 shows the case of a spool with four abutments 35, opposite to each other in pair, defined on each tooth 28 of a series defined on the lower flange 18 of the spool 11. This configuration can be used for example in the case of four cutting lines, each with a single cutting end exiting from the casing, or two cutting lines, each with two cutting ends exiting from the casing. Also in this case the number of abutments is indifferently 1 to 4, as there is, each $\pi/2$ radiants, a coupling, which causes the correct relative position spool/casing.

FIG. 10 shows for example the case of a spool 11 with three abutments 35 defined on three teeth, angularly displaced by $\pi/3$ radiants, of a series 28 of three defined on the lower flange 18. This configuration can be used for example in the case of a single cutting line with two cutting ends exiting from the casing or three cutting lines, each with two cutting ends. Also in this case the number of abutments is indifferent, as there is, each $\pi/3$ radiants, a coupling, which causes the correct relative position spool/casing.

It should be furthermore noted that in the example described above, corresponding to a preferred embodiment of the present invention, reference has been made to a structure, wherein the first part and the second part of the housing of the cutting line of a head according to the invention are respectively formed by the casing and by the spool. It is clear that other structures of the head can use a first and a second part of the housing constituted by other components of the head, as described for example in the patent application WO2008053508.

It is understood that what is illustrated purely represents possible non-limiting embodiments of the invention, which may vary in forms and arrangements without departing from the scope of the concept on which the invention is based. Any reference numbers in the appended claims are provided for the sole purpose of facilitating the reading thereof in the light of the description hereinbefore and the accompanying drawings and do not in any way limit the scope of protection of the present invention.

The invention claimed is:

1. A grass-cutting head comprising:
a spool for winding at least one cutting line; and
a housing for the at least one cutting line, wherein said housing comprises a first part and a second part coupled to each other so as to allow at least one reciprocal angular movement around an axis of rotation of the grass-cutting line, said housing comprising at least one passage towards the outside for a cutting line, at least one inserting portion being defined on said spool for a cutting line such that at a rotation of the spool corresponds a winding or unwinding of the cutting line, a winding means being present for winding said at least one cutting line around said spool and a matching means for matching an angular position of said at least one inserting portion on the spool with said at least one passage towards the outside of the housing designed to facilitate the operations for inserting the at least one cutting line into the spool, wherein said matching means for matching the angular position comprises at least one reversible coupling between at least one abutment associated with one of said first part and said second part and one corresponding counter-abutment associated with the other of said first part and said second part such that said at least one inserting portion and said at least one passage are mutually aligned to allow the cutting line to pass throughout when said at least one abutment is coupled with said corresponding counter-abutment, said at least one abutment being a tooth comprising an inclined sliding face and an opposite abutment face for the tooth, wherein a seat of reversible coupling is defined on a tip of said tooth, between said two inclined and abutment faces, on which said counter-abutment is designed respectively to slide and to couple, wherein sliding on said sliding face corresponds to an axial relative displacement between said first part and said second part from a position in which the head is in a use position to a position in which the head receives or extracts the at least one line from said spool.

2. A grass-cutting head as claimed in claim 1, wherein said coupling seat is concave and reentries towards the body of said tooth, said complementary counter-abutment comprising a projection with head substantially counter-shaped to said seat.

3. A grass-cutting head as claimed in claim 1, wherein a first series and a second series of axially and angularly offset teeth defined on one of said first part and said second part and a toothing defined on the other of said first part and said second part, said toothing being designed to interact alternatively with said first series and said second series depending upon the corresponding axial position of said first part and said second part, said at least one abutment constituting a tooth of said first series or of said second series or of said toothing.

4. A grass-cutting head as claimed in claim 3, further comprising a corresponding abutment or a pair of opposite abutments for each pair of opposite passages towards the outside defined on said housing through which at least one cutting line is available.

5. A grass-cutting head as claimed in claim 3, further comprising a corresponding abutment or a pair of opposite abutments for each single passage towards the outside defined on said housing through which at least one cutting line is available.

6. A grass-cutting head as claimed in claim 1, wherein each passage towards the outside defined on said housing corresponds said inserting portion for the insertion on the spool for a cutting line, said passage and said inserting portion resulting substantially mutually aligned according to a direction substantially radial to the axis of the head when said passage and said inserting portion present the same angular position around the same axis, said at least one abutment being coupled to the corresponding counter-abutment when said passage and said inserting portion are in the same angular position.

7. A grass-cutting head as claimed in claim 1, wherein said means for winding said at least one cutting line on said spool comprises an elastic means arranged between said first part and said second part, to a relative axial displacement of said first part and said second part from the position in which the head is in the use position to the position in which the head is ready for receiving or extracting the at least one line from said spool corresponding to a compression of the elastic means from a position in which the elastic means intersects the inserting direction of the at least one cutting line towards said spool to a position in which said elastic means is taken away from said inserting direction towards said spool.

8. A grass-cutting head as claimed in claim 1, further comprising an outer casing for containing said spool, said first part of the housing being defined by said casing, said second part of the housing being defined by said spool.

9. A grass-cutting head as claimed in claim 7, wherein a casing is defined by two mutually opposite bases, respectively one lower base and one upper base, and lateral flanks, from said spool developing a body arranged in a slidable manner through said lower base, said elastic means being arranged between said spool and said casing in such a manner as to contrast such a relative movement of said body and of said casing that the body is brought towards the inside of the casing, wherein a connecting portion is present on said upper base for connecting to a transmission of the device, to which the head must be applied.

10. A grass-cutting head as claimed in claim 9, wherein:
a first series of teeth is obtained on a side of an upper flange of the spool facing towards the upper base of the casing;
a second series of teeth is obtained on a side of a lower flange of the spool facing towards the lower base of the casing;
a toothing comprises a first toothing obtained on said upper base interacting with said first series of teeth, and a second toothing obtained on said lower base interacting with said second series of teeth, said first toothing and said second toothing being mutually angularly offset.

11. A grass-cutting head as claimed in claim 3, wherein said at least one abutment is defined on said first series or on said second series of teeth, said at least one counter-abutment being defined respectively on a lower base or an upper base of a casing.

12. A grass-cutting head as claimed in claim 3, wherein said at least one abutment is defined on a first toothing or on a second toothing, said at least one counter-abutment being defined on said spool.

13. A grass-cutting head as claimed in claim 3, wherein said spool presents a central hub presenting a perforation, transverse to the axis of one or more of the spool and the head, defining said at least one inserting portion for inserting one cutting line, wherein an elastic means is arranged between the outside of said perforation and a base of a casing.

14. A grass-cutting head as claimed in claim 13, wherein said elastic means comprises a coil spring arranged in a cylindric pocket defined at an end of the central hub of the spool and coaxially to the axis of the spool, said perforation being provided on the outside of said pocket but close to the pocket and radially facing towards the axis of the hub.

15. A grass-cutting head as claimed in claim 8, wherein said casing is defined by two mutually opposite bases, respectively one lower base and one upper base, and lateral flanks, from said spool developing a body arranged in a slidable manner through said lower base, said elastic means being arranged between said spool and said casing in such a manner as to contrast such a relative movement of said body and of said casing that the body is brought towards the inside of the casing, wherein a connecting portion is present on said upper base for connecting to a transmission of the device, to which the head must be applied.

16. A grass-cutting head as claimed in claim 9, wherein said at least one abutment is defined on a first series or on a second series of teeth, said at least one counter-abutment being defined respectively on said lower base or said upper base.

17. A grass-cutting head as claimed in claim 10, wherein said at least one abutment is defined on said first series or on said second series of teeth, said at least one counter-abutment being defined respectively on said lower base or said upper base.

18. A grass-cutting head as claimed in claim 9, wherein said at least one abutment is defined on said first toothing or on said second toothing, said at least one counter-abutment being defined on said spool.

19. A grass-cutting head as claimed in claim 10, wherein said at least one abutment is defined on said first toothing or on said second toothing, said at least one counter-abutment being defined on said spool.

* * * * *